US008619745B2

(12) United States Patent
Kuo

(10) Patent No.: US 8,619,745 B2
(45) Date of Patent: *Dec. 31, 2013

(54) METHOD AND APPARATUS OF SELECTING OPERATING FREQUENCY FOR USER EQUIPMENT IN A WIRELESS COMMUNICATIONS SYSTEM

(75) Inventor: Richard Lee-Chee Kuo, Taipei (TW)

(73) Assignee: Innovative Sonic Limited, Port Louis (MU)

(*) Notice: Subject to any disclaimer, the term of this patent is extended or adjusted under 35 U.S.C. 154(b) by 56 days.

This patent is subject to a terminal disclaimer.

(21) Appl. No.: 13/251,678

(22) Filed: Oct. 3, 2011

(65) Prior Publication Data
US 2012/0026930 A1 Feb. 2, 2012

Related U.S. Application Data

(63) Continuation of application No. 11/984,075, filed on Nov. 13, 2007, now Pat. No. 8,031,735.

(60) Provisional application No. 60/865,607, filed on Nov. 13, 2006.

(51) Int. Cl.
*H04L 12/28* (2006.01)
*H04J 1/16* (2006.01)

(52) U.S. Cl.
USPC ............ 370/343; 370/252; 370/329; 370/430

(58) Field of Classification Search
USPC .................................. 370/430, 252, 329, 343
See application file for complete search history.

(56) References Cited

U.S. PATENT DOCUMENTS

2006/0072516 A1* 4/2006 Jeong et al. ................... 370/335
2010/0061290 A1* 3/2010 Lee et al. ...................... 370/312

* cited by examiner

*Primary Examiner* — John Pezzlo
(74) *Attorney, Agent, or Firm* — Blue Capital Law Firm, P.C.

(57) ABSTRACT

In order to prevent from being incapable of receiving Multimedia Broadcast Multicast Service, called MBMS hereinafter, service when a user equipment (UE) has a connection for signaling only, the present invention provides a method of selecting an MBMS operating frequency for the UE in a wireless communications system. The method includes determining a radio bearer state of the UE, and switching a current operating frequency of the UE to a preferred frequency corresponding to an MBMS service prioritized by upper layers when the radio bearer state of the UE is in signaling transmission state.

18 Claims, 4 Drawing Sheets

METHOD AND APPARATUS OF SELECTING OPERATING FREQUENCY FOR USER EQUIPMENT IN A WIRELESS COMMUNICATIONS SYSTEM

CROSS-REFERENCE TO RELATED APPLICATIONS

This application is a Continuation of U.S. patent application Ser. No. 11/984,075, filed on Nov. 13, 2007, which claims the benefit of U.S. Provisional Application Ser. No. 60/865,607, filed Nov. 13, 2006, the entire disclosures of which are incorporated herein by reference.

FIELD

The present invention relates to a method of selecting an operating frequency in a wireless communications system and related communications device, and more particularly to a method of selecting an operating frequency corresponding to a multimedia broadcast multicast service for a user equipment in a wireless communications system and related communications device.

BACKGROUND

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. To enhance multimedia functions in the 3G mobile telecommunications system, a protocol specification developed by the 3rd Generation Partnership Project (3GPP) provides Multimedia Broadcast Multicast Service (MBMS). MBMS is a point-to-multipoint bearer service and is established on an existing network architecture of the Universal Mobile Telecommunications System (UMTS), utilizing Internet Protocol (IP) packets as a medium. Thus, MBMS allows a single source entity to transmit data to multiple user equipments (UEs) simultaneously.

According to the protocol specification developed by the 3GPP, MBMS offers two delivery modes: MBMS Broadcast delivery mode and MBMS Multicast delivery mode. When interested in a specific MBMS service, the LIE needs to order the MBMS service from a Broadcast Multicast Service Center (BM-SC) by establishing a service agreement including specific service provision phases. These two delivery modes have different service provision phases. The service provision phase of MBMS Broadcast delivery mode includes Service announcement, Session Start, MBMS notification. Data Transfer and Session Stop. The service provision phase of MBMS Multicast delivery mode includes Subscription. Service announcement, Joining, Session Start, MBMS notification, Data Transfer, Session Stop and Leaving. For realizing customized services, Joining and Leaving sessions utilized in MBMS Multicast delivery mode enable the BM-SC to execute authorization and payment recording for the UEs at the Joining session. The service provision phases mentioned above are well known in the art, and will not be described in detail.

On the other hand, from the standpoint of radio resource control (RRC), all logical data communication exchange channels, be they for providing data transmission exchange to the UE or for providing RRC layer control signal transmission exchange, are defined in the context of a Radio Bearer (RB). In the UE end, the RB comprises one unidirectional, or a pair of, uplink/downlink logic data transmission exchange channels. In the network end, the RB comprises one unidirectional, or a pair of, uplink/downlink logic data transmission exchange channels. For example, a UMTS Terrestrial Radio Access Network (UTRAN) transmits MBMS configuration to the UE by establishing RBs, and the UP stops receiving MBMS service by releasing the RBs. Besides, according to the RRC protocol specification provided by the 3GPP, an RRC state of the UE can be a disconnection mode or an RRC connection mode. The disconnection mode includes Idle mode, and the RRC connection mode includes CELL_PCH, URA_PCH, CELL_FACH and CELL_DCH states.

When providing the MBMS service, the UTRAN may obtain the number of the UEs ordering the MBMS service via a counting procedure, and can adopt either one of the following two transmission modes: point-to-point (p-t-p) transmission and point-to-multipoint (p-t-m) transmission. The UTRAN utilizes the p-t-m transmission to transfer data if the Broadcast mode is selected. On the contrary, if the Multicast mode is selected, the UTRAN utilizes either the p-t-p transmission or the p-t-m transmission to transfer data according to the number of the UEs. In the p-t-p transmission, transmission between the UEs and the UTRAN utilizes a dedicated channel, and thereby the Node-B establishes one dedicated channel for one UE to transmit data and configuration. Compared with the p-t-p transmission, the p-t-m transmission allows a core network (CN) to provide the data and the configuration for multiple UEs in the same cell simultaneously.

In the protocol specification developed by the 3GPP, three logical channels are defined to transmit corresponding MBMS information: MBMS point-to-multipoint Control Channel (MCCH), MBMS point-to-multipoint Traffic Channel (MTCH), and MBMS point-to-multipoint Scheduling Channel (MSCH). MCCH is utilized to transmit a corresponding MBMS configuration, including MBMS Neighboring Cell Information, MBMS Radio Bearer Information, MBMS Service Information, and other information. MTCH is responsible for transferring service data to the UEs. MSCH is used for notifying the UEs with scheduling information of MBMS services. With MSCH, the UEs are allowed to execute reception only when data begins to be transferred, without needing to keep a receiving state on throughout the whole service process.

Generally speaking, the UTRAN includes two or more carrier frequencies for providing a variety of services for UEs, and the UEs are appropriately distributed on these carrier frequencies. On the other hand, for the UE end, when the MBMS service the UE is interested in, or the state of the joined MBMS service, changes, the UE can perform a frequency selection procedure for following service reception operations. According to the meeting document R2-063613 of the 3GPP (3GPP TSG-RAN WG2 Meeting #56), when the UE receives an information element (IE) "MBMS Preferred frequency information" or an IE "MBMS PL Service Restriction Information," or when the preferred MBMS service changes, the UE shall perform an MBMS frequency selection procedure for transferring a current operating frequency to a preferred frequency corresponding with an MBMS service prioritized by upper layers, so as to execute reception of the concerned MBMS service. The IE "MBMS Preferred frequency information" is included in a message named "MBMS MODIFIED SERVICES INFORMATION", and is utilized for notifying the UE of the preferred frequency layer corresponding to the concerned MBMS services. The IE "MBMS PL Service Restriction Information" can be sent to the UE through a Radio Bearer Control message, a CELL UPDATE CONFIRM message or an MBMS GENERAL INFORMATION message, and is utilized for notifying the UE that the UTRAN will not provide any new non-MBMS services on the preferred frequency layer, which means that the preferred frequency layer is currently congested. In other words, if the IE "MBMS PL Service Restriction Information" is not included in the MBMS GENERAL INFORMATION message for the preferred frequency layer, there are still free radio resources available on the preferred frequency layer where the UTRAN can also provide the non-MBMS services.

Additionally, according to the protocol specification developed by the 3GPP, the above Radio Bearer Control message and the CELL UPDATE CONFIRM message are sent on a dedicated control channel (DCCH) for a dedicated UE, and the MBMS GENERAL INFORMATION message is sent on MCCH, which is broadcasted for all UEs in a cell. The Radio Bearer Control message can be a RADIO BEARER RECONFIGURATION message, a RADIO BEARER SETUP message, a RADIO BEARER RELEASE message, a TRANSPORT CHANNEL RECONFIGURATION message or a PHYSICAL CHANNEL RECONFIGURATION message, which are well known by those skilled in the art, and thus not narrated herein.

As the UE operates in different RRC states, the behavior of performing the MBMS frequency selection procedure is also different, and the following is aimed at a situation in which the UE operates in the CELL_PCH state, the URA_PCH state and the CELL_FACH state. Initially, if there exists one or more preferred frequencies for services included in a variable MBMS_ACTIVATED_SERVICES, which is stored in the UE, and the latest received CELL UPDATE CONFIRM message or Radio Bearer Control message did not include the IE "MBMS PL Service Restriction Information", which is sent by the UTRAN on DCCH, the UE can proceed to following frequency selection.

Then, the UE determines a radio bearer state established with the UTRAN through a variable "ESTABLISHED_RABS" stored in the UE as a reference for performing frequency selection. For example, if the variable "ESTABLISHED_RABS" is not empty, the UE can keep staying on a current operating frequency when the current operating frequency of the UE is equal to a preferred frequency corresponding with an MBMS service prioritized by upper layers. On the other hand, when the current operating frequency of the UE is not equal to a preferred frequency corresponding with the MBMS service prioritized by upper layers, the UE can select the preferred frequency as the operating frequency, for which the IE "MBMS PL Service Restriction Information" is not included in the MBMS GENERAL INFORMATION message sent by the UTRAN. Otherwise, the UE shall select another preferred frequency corresponding to an MBMS service with lower priorities, for which the IE "MBMS PL Service Restriction Information" cannot be included in the MBMS GENERAL INFORMATION message.

The variable ESTABLISHED_RABS is used to store information about both established radio access bearers and signaling radio bearers in the UE, and thus a situation in which the variable "ESTABLISHED_RABS" is not empty means that the UE has established radio bearers, which may include the radio access bearers for transmitting packet data or the signaling radio bearers for signaling only. In this case, when the current operating frequency of the UE is not equal to a preferred frequency corresponding to the MBMS service prioritized by upper layers for which the IE "MBMS PL Service Restriction Information" has been received in the MBMS GENERAL INFORMATION message, the UE cannot select the preferred frequency as an operating frequency. That means, in the situation, the UE cannot select the frequency, which is determined to be congested by the UTRAN, for receiving the concerned MBMS service.

As well known by those skilled in the art, the signaling radio bearer does not consume too much radio resource. However, according to the above-mentioned meeting document, even if the established radio bearers of the UE only include the signaling radio bearers, the UE still cannot transfer to the preferred frequency, which is determined to be congested by the UTRAN, so that the UE will lose the opportunity for receiving the concerned MBMS service.

SUMMARY

According to the present invention, a method for a user equipment of a wireless communications system for selecting an operating frequency corresponding to a multimedia broadcast multicast service, called MBMS service hereinafter, comprises determining a radio bearer state of the user equipment; and switching a current operating frequency of the user equipment to a preferred frequency corresponding to an MBMS service prioritized by upper layers when the radio bearer state of the user equipment is in signaling transmission state.

According to the present invention, a communications device for selecting an operating frequency corresponding to a multimedia broadcast multicast service, called MBMS service hereinafter, in a wireless communications system comprises a control circuit for realizing functions of the communications device; a processor installed in the control circuit, for executing a program code to command the control circuit; and a memory installed in the control circuit and coupled to the processor for storing the program code. The program code comprises determining a radio bearer state; and switching a current operating frequency to a preferred frequency corresponding to an MBMS service prioritized by upper layers when the radio bearer state is in signaling transmission state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
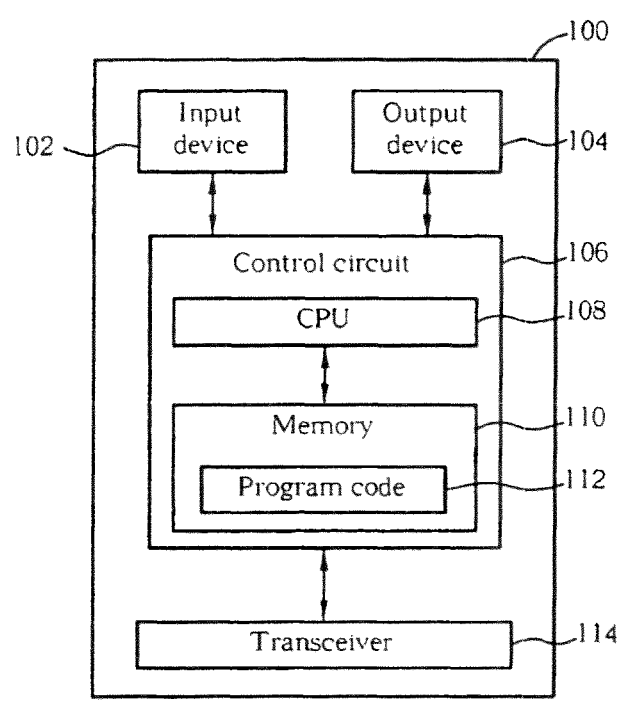
FIG. 1 is a Functional block diagram of a communications device.

Please refer to FIG. 1, which is a functional block diagram of a communications device 100. For the sake of brevity. FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
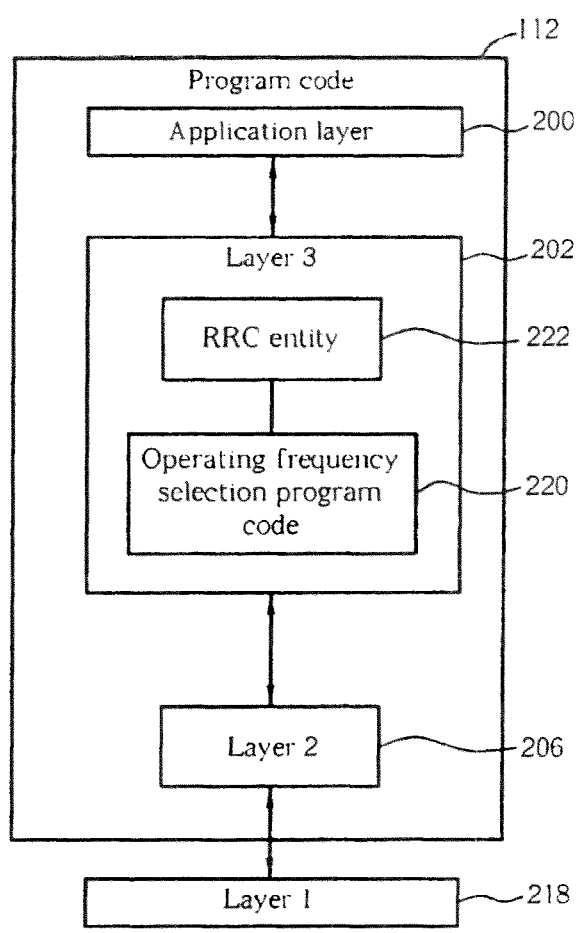
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222, which is used for controlling the Layer 1 218 and the Layer 2 206 and performing peer-to-peer RRC communication with other communications devices, such as a base station or a Node-B. In addition, the RRC entity 222 can change an RRC state of the communications device 100, switching between an Idle mode, CELL_PCH, URA_PCH, CELL_FACH or CELL_DCH state.

Figure 3:
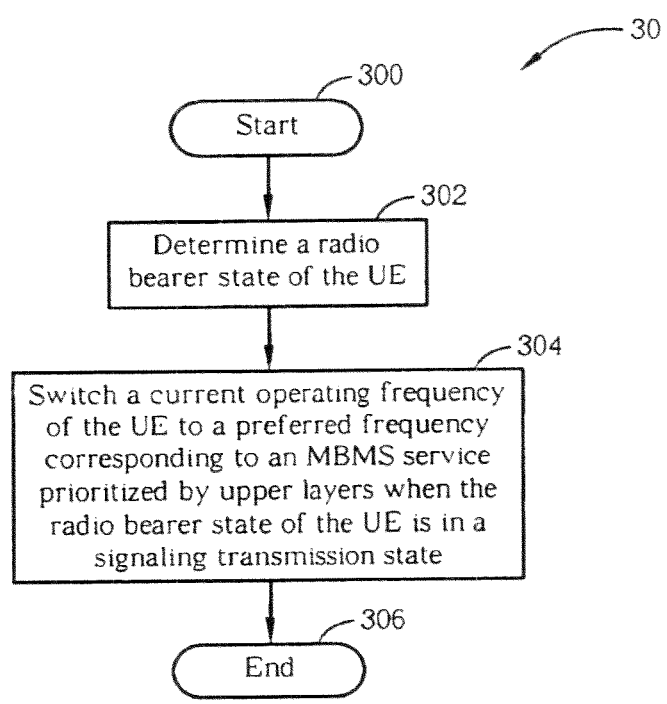
FIG. 3 is a flowchart diagram of a process according to an embodiment of the present invention.

As for Multimedia Broadcast Multicast Services (MBMS), a UMTS Terrestrial Radio Access Network (UTRAN) can generate RRC messages and information elements (IEs) to include MBMS configuration and then transmit them with a Point-to-Point Radio Bearer (p-t-p RB) or a Point-to-Multipoint Radio Bearer (p-t-m RB) to the communications device 100. In the CELL_PCH, the URA_PCH and the CELL_FACH state, when the application layer 200 is about to use an MBMS service or the state of a joined MBMS service changes, the RRC entity 222 performs a frequency selection procedure for transferring a current operating frequency to a corresponding carrier frequency to execute following service reception operations. In this situation, the embodiment of the present invention provides an operating frequency selection program code 220 to improve an operating frequency selection mechanism when radio resources of a user equipment (UE) is only utilized for signaling only, so as to prevent the UE from incapable of receiving a concerned MBMS service. Please refer to FIG. 3, which illustrates a schematic diagram of a process 30 according to an embodiment of the present invention. The process 30 is utilized for a user equipment (UE) of a wireless communications system for selecting an operating frequency corresponding to an MBMS service, and can be compiled into the operating frequency selection program code 220. The process 30 includes the following steps:

Step 300: Start.

Step 302: Determine a radio hearer state of the UE.

Step 304: Switch a current operating frequency of the UE to a preferred frequency corresponding to an MBMS service prioritized by upper layers when the radio bearer state of the UE is in a signaling transmission state.

Step 306: End.

According to the process 30, the embodiment of the present invention determines the radio bearer state of the UE, and then switches the current operating frequency of the UE to the preferred frequency corresponding to the MBMS service prioritized by upper layers, e.g. the application layer 200, when the radio bearer state of the UE is in the signaling transmission state. In this case, since signaling transmission does not consume too much radio resources, the RRC entity 222 can switch the current operating frequency to the preferred frequency corresponding to the MBMS service no matter whether the preferred frequency is determined to be congested or not. Therefore, the embodiment of the present invention can improve a situation in which the UE is incapable of selecting the preferred frequency determined to be congested by the UTRAN when the radio resources of the UE are utilized for signaling transmission only, so as to increase the opportunity for successfully receiving the MBMS services.

Preferably, the embodiment of the present invention determines the radio bearer state of the UE according to an information element (IE) "RAB information" of a variable "ESTABLISHED_RABS" stored in the UE. The IE "RAB information" is used to store information about established radio access bearers (RAB) of the UE, and thus compared with the prior arts, the embodiment of the present invention utilizes the IE "RAB information" of the variable "ESTABLISHED_RABS" stored in the UE for determining the radio bearer state of the UE.

Figure 4:
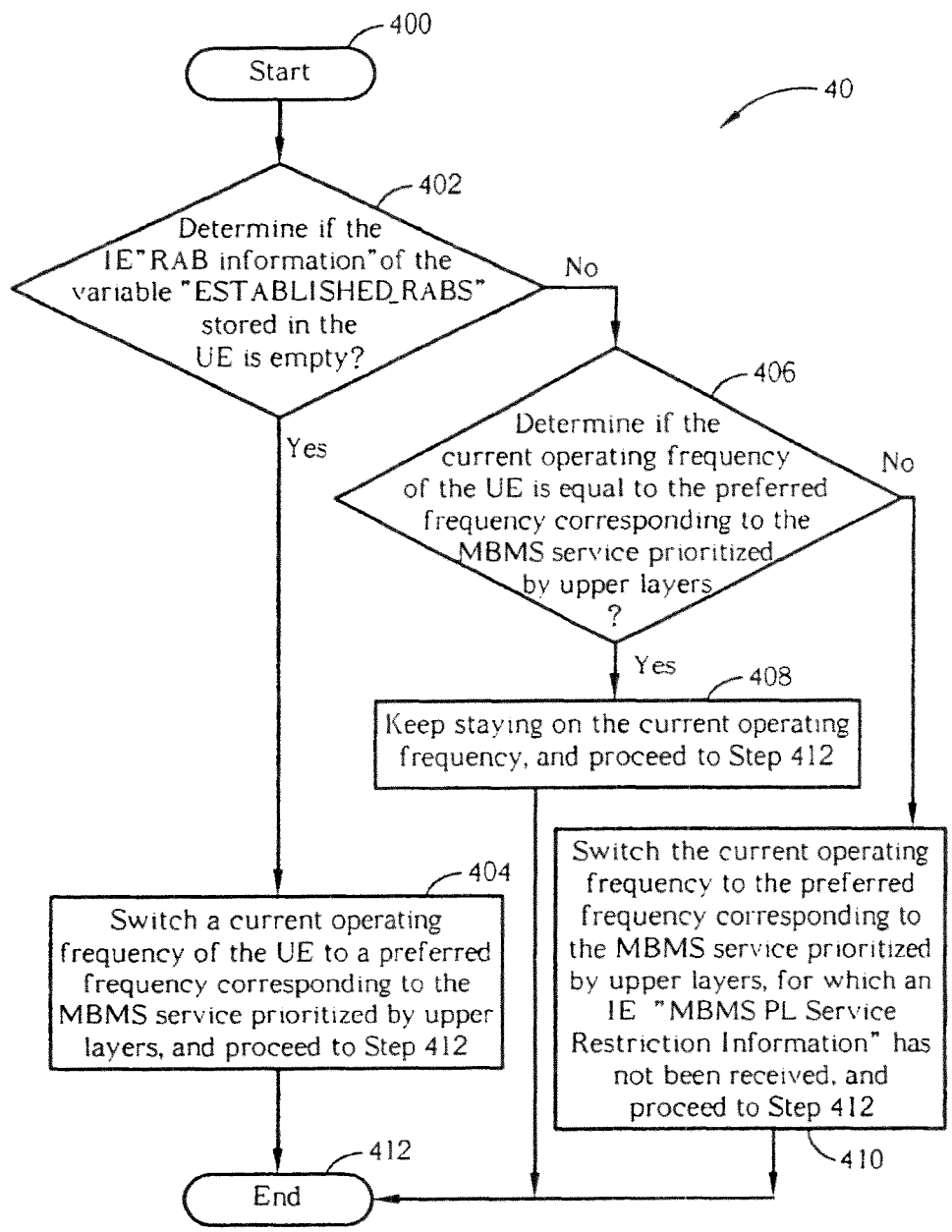
FIG. 4 is a flowchart diagram of a process according to another embodiment of the present invention.

Please continue to refer FIG. 4. FIG. 4 is a schematic diagram of a process 40 according to an embodiment of the present invention. The process 40 is utilized for a user equipment (UE) of a wireless communications system for selecting an operating frequency corresponding to an MBMS service, and can be compiled into the operating frequency selection program code 220. The process 40 includes the following steps:

Step 400: Start.

Step 402: Determine if the IE "RAB information" of the variable "ESTABLISHED_RABS" stored in the UE is empty. If so, proceed to Step 404; and if not, proceed to Step 406.

Step 404: Switch a current operating frequency of the UE to a preferred frequency corresponding to the MBMS service prioritized by upper layers, and proceed to Step 412.

Step 406: Determine if the current operating frequency of the UE is equal to the preferred frequency corresponding to the MBMS service prioritized by upper layers. If so, proceed to Step 408; and if not, proceed to Step 410.

Step 408: Keep staying on the current operating frequency, and proceed to Step 412.

Step 410: Switch the current operating frequency to the preferred frequency corresponding to the MBMS service prioritized by upper layers, for which an IE "MBMS PL Service Restriction Information" has not been received, and proceed to Step 412.

Step 412: End.

According to the process 40, a situation in which the IE "RAB information" of the variable "ESTABLISHED_RABS" is determined to be empty means that the UE does not have any established radio access hearers (RABs). In other words, the UE only has signaling radio bearers (SRBs) utilized for transmitting radio resource control signaling. In this case, the RRC entity 222 can switch the current operating frequency to the preferred frequency corresponding to the MBMS service no matter whether the preferred frequency is determined to be congested or not, i.e. no matter whether the IE "MBMS PL Service Restriction Information" has been received in an MBMS GENERAL INFORMATION message for the preferred frequency or not, so as to receive the concerned MBMS service.

On the other hand, a situation in which the IE "RAB information" of the variable "ESTABLISHED_RABS" is determined not to be empty means that the UE does have established radio access bearers (RABs). At this time, if the current operating frequency of the UE is equal to the preferred frequency corresponding to the MBMS service prioritized by upper layers, the UE can keep staying on the current operating frequency (Step 408), On the contrary, if not, the UE switches the current operating frequency to the preferred frequency corresponding to the MBMS service for which the IE "MBMS PL Service Restriction Information" has not been received in the MBMS GENERAL INFORMATION message; otherwise, the UE shall select another preferred frequency corresponding to an MIMS service with lower priorities for which the IE "MBMS PL Service Restriction Information" still cannot be included.

As mentioned above, compared with the prior arts, the present invention utilizes the IE "RAB information" of the variable "ESTABLISHED_RABS" stored in the UE for determining the radio bearer state of the UE. Therefore, when the radio resources of the UE are utilized for signaling transmission only, the embodiment of the present invention can improve the situation in which the UE is incapable of being transferred to the preferred frequency determined to be congested by the UTRAN, so as to increase the opportunity for successfully receiving the MBMS services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a user equipment of a wireless communications system for selecting an operating frequency corresponding to a multimedia broadcast multicast service, called MBMS service hereinafter, comprising:
    determining by the user equipment a radio bearer state of the user equipment according to an information element "RAB information" of a variable "ESTABLISHED_RABS" stored in the user equipment; and
    switching by the user equipment a current operating frequency of the user equipment to a congested preferred frequency corresponding to an MBMS service prioritized by upper layers if the radio bearer state of the user equipment is in a signaling transmission state.

2. The method of claim 1, wherein the radio bearer state of the user equipment being in the signaling transmission state is defined by the information element "RAB information" of the variable "ESTABLISHED_RABS" being empty.

3. The method of claim 1, wherein the MBMS service is a service of Broadcast type.

4. The method of claim 1, wherein the MBMS service is a service of Multicast type.

5. The method of claim 1, wherein the user equipment operates in a CELL_PCH state.

6. The method of claim 1, wherein the user equipment operates in a URA_PCH state.

7. The method of claim 1, wherein the user equipment operates in a CELL_FACH state.

8. The method of claim 1, wherein the wireless communications system is a third generation communications system.

9. The method of claim 1, wherein a preferred frequency is determined to be congested if the IE "MBMS PL Service Restriction Information" for the preferred frequency has been received in the MBMS GENERAL INFORMATION message.

10. A communications device for selecting an operating frequency corresponding to a multimedia broadcast multicast service, called MBMS service hereinafter, in a wireless communications system, the communications device comprising:
    a control circuit for realizing functions of the communications device;
    a processor installed in the control circuit, for executing a program code to command the control circuit; and
    a memory installed in the control circuit and coupled to the processor for storing the program code;
    wherein the program code comprises:
        determining a radio bearer state of the user equipment according to an information element "RAB information" of a variable "ESTABLISHED_RABS" stored in the user equipment; and
        switching a current operating frequency to a congested preferred frequency corresponding to an MBMS service prioritized by upper layers if the radio bearer state is in signaling transmission state.

11. The communications device of claim 10, wherein the radio bearer state of the user equipment being in the signaling transmission state is defined by the information element "RAB information" of the variable "ESTABLISHED_RABS" being empty.

12. The communications device of claim 10, wherein the MBMS service is a service of Broadcast type.

13. The communications device of claim 10, wherein the MBMS service is a service of Multicast type.

14. The communications device of claim 10, wherein the communications device operates in a CELL_PCH state.

15. The communications device of claim 10, wherein the communications device operates in a URA_PCH state.

16. The communications device of claim 10, wherein the communications device operates in a CELL_FACH state.

17. The communications device of claim 10, wherein the wireless communications system is a third generation communications system.

18. The communications device of claim 10, wherein a preferred frequency is determined to be congested if the IE "MBMS PL Service Restriction Information" for the preferred frequency has been received in the MBMS GENERAL INFORMATION message.

* * * * *